Feb. 17, 1931.  E. A. REED  1,792,604
BIT
Filed Oct. 7, 1925   2 Sheets-Sheet 1
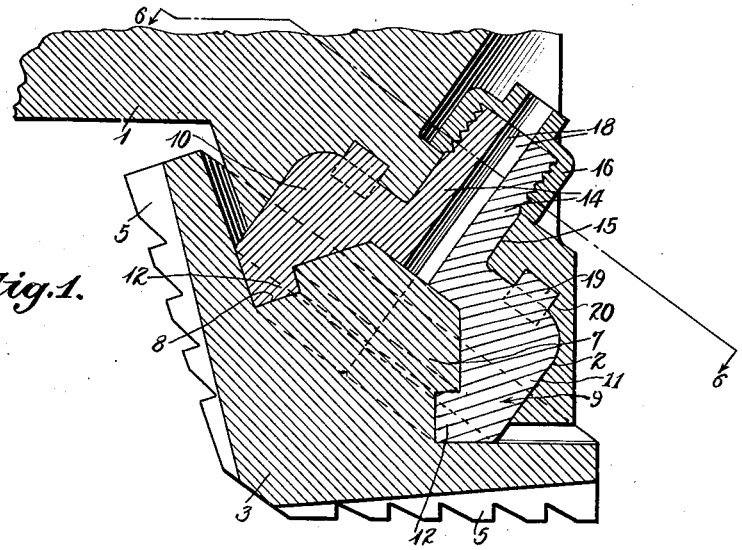
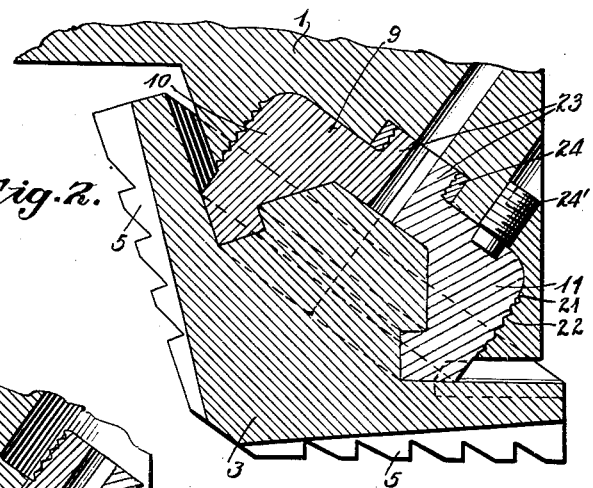
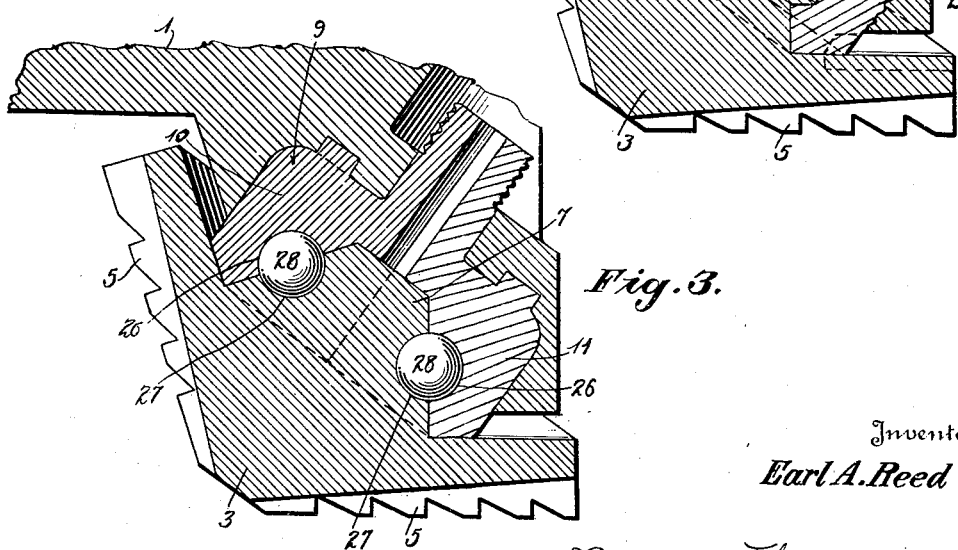
Inventor
Earl A. Reed
By Bacon & Thomas
Attorneys Feb. 17, 1931.    E. A. REED    1,792,604
BIT
Filed Oct. 7, 1925    2 Sheets-Sheet 2

Inventor
Earl A. Reed
By Bacon & Thomas
Attorneys

Patented Feb. 17, 1931

1,792,604

UNITED STATES PATENT OFFICE

EARL A. REED, OF TULSA, OKLAHOMA

BIT

Application filed October 7, 1925. Serial No. 60,953.

The invention relates to improvements in rotary boring drills provided with revolvable cutters.

The invention among its many objects aims to provide a boring drill having a cutter provided with a frusto-conical spindle.

It is a further object of the invention to provide a cutter for a boring drill having teeth so cut as to resist side thrusts from the operating stem.

The invention further aims to provide improved means for detachably mounting the cutter to the bit head. With this novel thought in mind the invention embodies a bearing member removably connected with the bit head and constructed to receive and retain a cutter spindle permitting a rotary movement thereof, while preventing said spindle from moving longitudinally or vertically.

In the accompanying drawings Figure 1 illustrates a view of the improved form of my apparatus.

Figure 2 is a modified view of the bearing for mounting the cutter spindle.

Figure 3 is a further modified view of the bearing.

Figure 4:
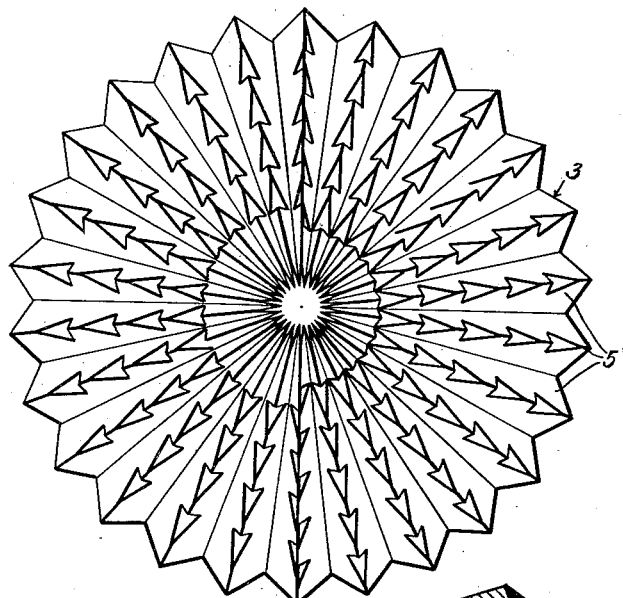
Figure 4 is a detail view of one form of cutter.

Referring now more particularly to the drawings, wherein like reference characters indicate corresponding parts, and having special reference to Figure 1, the numeral 1 designates the lower portion of a bit head. This head is provided with a pocket 2. The head is adapted to receive a rotating cutter, the invention relating to a rotary boring drill where the cutter is rotated through the operation of the drill stem. The invention among other things relates to the mode of attaching the cutter to the drill head.

The cutter 3 is, as will be noted, of a frusto-conical shape. The sides of the cutter are provided with teeth 5 approximately pyramidal in shape, except that the sides of the pyramidal shapes from the most distant point of the axis of the vertical tool are formed approximately parallel therewith so as to present shoulders on said teeth to prevent a tendency to drill a hole tangentially from the vertical. The structure of these teeth is clearly shown in Figure 4 of the drawings. While it is preferable to so construct the cutter it is obvious that it is not necessary that all cutters used with this invention be so made as conventional conical cutters can be used with the bearings to be later described. The cutter has a suitable spindle 7 extending upwardly therefrom provided with a circumferential groove 8. This spindle is frusto-conical in shape, which is an important feature of this invention.

As shown in Figure 1 when the cutter is to be attached to the drill head, it is secured in position by a bearing 9. This bearing embodies sections 10 and 11. The sections are each provided with a flange 12 adapted to enter the groove 8 in the spindle 7. The bearing sections are fitted around the spindle and the assembly then placed in the socket 2 in the drill head. The bearing sections have threaded extensions 14 which project through an aperture 15 in the drill head and are threaded at their outer ends. A nut 16 fits over these threaded sections for uniting the bearing to the drill head. The threaded sections are likewise provided with semi-circular openings 18 constituting a lubricant feed by means of which lubricant may be fed to the bearing for the rotating spindle 7.

It will be understood that the spindle carrying the cutter freely rotates while the bearing is held stationary. To hold this bearing stationary an interlock between the bearing sections and the drill head is provided. This interlock may embrace pins 19 on the bearing sections which enter sockets or indentations 20 in the drill head. It will be appreciated, however, that any form of an interlocking connection can be used for this purpose. The bearing permits a ready removal of the cutter for the substitution of a new one, while at the same time it retains the cutter so that it may freely revolve, but is not capable of any endwise movement.

In Figure 2 of the drawings I have shown a modified form of bearing in which the bearing sections 10 and 11 are externally threaded, as indicated by the character 21, these threads engaging complemental threads 22 in the drill head. The cutter and spindle are of the same formation in this embodiment of the invention as in the embodiment shown in Figure 1. The bearing sections 9 and 10, however, are provided with short collars 23 receiving a threaded nut 24 for holding the sections 9 and 10 together, while they are being threaded in the drill head. After being threaded in position a lock screw 24' is provided which passes through an opening in the drill head and enters a socket in one of the bearing sections to prevent a rotation thereof.

In Figure 3 of the drawings I have shown a further modification of the invention, wherein the bearing members 10 and 11 as shown in Figure 1, are provided with semi-circular raceways 26, while the spindle 7 of the cutter 3 is provided with a complemental semi-circular raceway 27 receiving the anti-friction bearings 28. In this manner the cutter is anti-frictionally mounted in its bearing, the bearing and the cutter being otherwise the same as shown in Figure 1 and heretofore described.

Figure 5:
Figure 5 is a view of a modified form of cutter.
Figure 6:
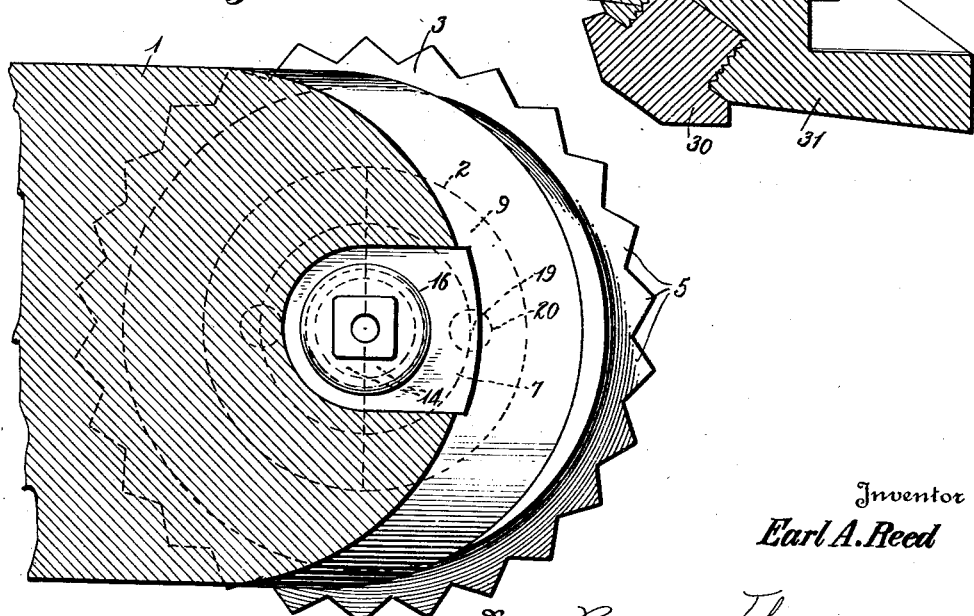
Figure 6 is a sectional view on the line 6—6 of Fig. 1.

As heretofore described, the cutter spindle, as well as the cutter, is frusto-conical in shape. This form of spindle has been found to be advantageous in drills. While it is preferably used with the bearing hereinbefore described, it will be understood, of course, that any other type of rotated cutter can be employed. Instead of utilizing the teeth found on the cutter, as shown in Figure 1, I may, if desirable, employ a modified form of cutter as shown in Figure 5. In this figure I secure a small cutter head 30 to the main frusto-conical cutter 31. This auxiliary cutter is provided with left hand threads 32 so as to be firmly secured to the main or large cutter. In use the auxiliary cutter prevents the main cutter from sliding sidewise relative to the axis of the hole, and when using the auxiliary cutter the teeth, as shown in Figure 1, need not of necessity be employed on the main cutter, as the auxiliary cutter will prevent the sidewise movement for which these teeth are provided.

Having thus described my invention, what I claim is:

1. In a drill, the combination with a drill head having a cutter receiving pocket therein, of a bearing receivable in said pocket, said bearing comprising separable sections and an annular member having threaded engagement with said sections for holding them in assembled relation, a cutter spindle receivable in said bearing and means for retaining said bearing within said pocket.

2. In a drill, the combination with a drill head having a substantially cylindrical pocket therein, of a substantially cylindrical bearing receivable in said pocket, said bearing being axially divided to form separable sections and means to secure said sections together comprising a threaded neck portion on said bearing and a threaded ring engageable therewith and a cutter having a spindle engageable within said bearing.

3. In a drill, the combination with a drill-head having a substantially cylindrical pocket therein, of a substantially cylindrical bearing receivable in said pocket, said bearing being axially divided to form separable sections, means to secure said sections together comprising a threaded neck portion on said bearing and a threaded ring engageable therewith, a cutter having a spindle engageable within said bearing, means cooperating with the spindle for maintaining the same free from axial movement with respect to the bearing.

4. In a drill, the combination with a drill-head having a substantially cylindrical pocket therein, of a substantially cylindrical bearing receivable in said pocket, said bearing being axially divided to form separable sections, means to secure said sections together comprising a threaded neck portion on said bearing and a threaded ring engageable therewith, a cutter having a spindle engageable within said bearing, the bearing sections having flange portions cooperating with the spindle to maintain the latter free from axial movement.

In testimony whereof I affix my signature.

EARL A. REED.